(12) United States Patent
Taguchi et al.

(10) Patent No.: US 9,242,655 B2
(45) Date of Patent: Jan. 26, 2016

(54) CRASH ENERGY ABSORBER OF RAILCAR

(75) Inventors: Makoto Taguchi, Akashi (JP); Atsushi Sano, Kakogawa (JP); Toshiyuki Yamada, Kobe (JP); Hideki Kumamoto, Akashi (JP); Seiichiro Yagi, Akashi (JP); Masayuki Tomizawa, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 150 days.

(21) Appl. No.: 13/988,388

(22) PCT Filed: Oct. 11, 2011

(86) PCT No.: PCT/JP2011/005676
§ 371 (c)(1),
(2), (4) Date: May 20, 2013

(87) PCT Pub. No.: WO2012/066720
PCT Pub. Date: May 24, 2012

(65) Prior Publication Data
US 2013/0233200 A1    Sep. 12, 2013

(30) Foreign Application Priority Data
Nov. 19, 2010   (JP) .................... 2010-258536

(51) Int. Cl.
*B61D 15/06*   (2006.01)
*B61D 17/06*   (2006.01)
(Continued)

(52) U.S. Cl.
CPC .......... *B61D 15/06* (2013.01); *B61D 17/06* (2013.01); *B61G 11/16* (2013.01); *F16F 7/12* (2013.01)

(58) Field of Classification Search
CPC .......... B61D 15/06; B61D 17/06; F16F 7/12; B60R 19/34; B60R 2019/186; B61G 11/16
USPC .......... 105/392.5; 293/133, 146; 188/377; 296/205, 187.11, 187.03
See application file for complete search history.

(56) References Cited

U.S. PATENT DOCUMENTS 5,113,769 A * 5/1992 Okuno et al. ............... 105/422
7,533,927 B2 * 5/2009 Ito et al. ..................... 296/187.03
(Continued)

FOREIGN PATENT DOCUMENTS

EP   1 746 007 A2   1/2007
EP   2 168 838 A1   3/2010
(Continued)

OTHER PUBLICATIONS

Nov. 3, 2014 Office Action issued in Chinese Application No. 201180053606.6.
(Continued)

*Primary Examiner* — Mark Le
(74) *Attorney, Agent, or Firm* — Oliff PLC

(57) ABSTRACT

A crash energy absorber is provided at a front portion of a carbody of a railcar and configured to crush by a load from a front side to absorb crash energy. The crash energy absorber includes: a main absorbing portion extending in a front-rear direction; and a pair of sub absorbing portions respectively provided at upper and lower sides of the main absorbing portion. Each of the pair of sub absorbing portions is formed integrally with the main absorbing portion via breakable portions each extending in the front-rear direction.

8 Claims, 13 Drawing Sheets

(51) Int. Cl.
  *B61G 11/16* (2006.01)
  *F16F 7/12* (2006.01)

(56) References Cited

U.S. PATENT DOCUMENTS

| | | | |
|---|---|---|---|
| 8,052,184 B2* | 11/2011 | Braunbeck et al. | 293/133 |
| 2004/0113464 A1* | 6/2004 | Kasuga | 296/205 |
| 2008/0116720 A1* | 5/2008 | Yamaguchi et al. | 296/187.11 |
| 2009/0026801 A1* | 1/2009 | Murayama et al. | 296/187.05 |

FOREIGN PATENT DOCUMENTS

| | | |
|---|---|---|
| JP | A-2000-318608 | 11/2000 |
| JP | 2001-026268 A | 1/2001 |
| JP | A-2001-55141 | 2/2001 |
| JP | A-2002-286066 | 10/2002 |
| JP | A-2004-188998 | 7/2004 |
| JP | A-2004-352033 | 12/2004 |
| JP | A-2005-59719 | 3/2005 |
| JP | A-2005-162049 | 6/2005 |
| JP | A-2007-253905 | 10/2007 |
| JP | A-2007-326553 | 12/2007 |
| JP | A-2008-126856 | 6/2008 |

OTHER PUBLICATIONS

Jan. 17, 2012 International Search Report issued in Application No. PCT/JP2011/005676 (with translation).

* cited by examiner d = 0 mm d = 100 mm d = 300 mm d = 500 mm d = 700 mm d = 0 mm d = 100 mm d = 300 mm d = 500 mm d = 700 mm

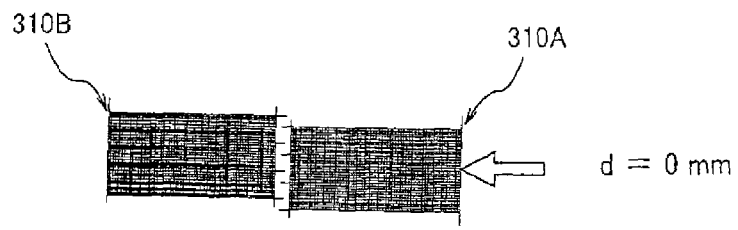
Fig. 12A  d = 0 mm
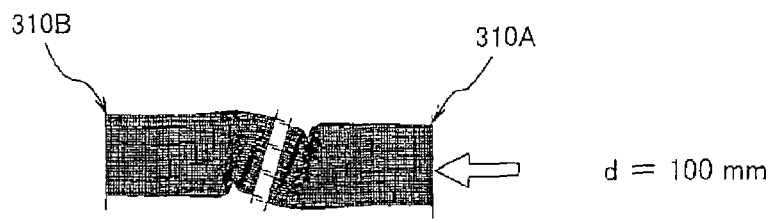
Fig. 12B  d = 100 mm
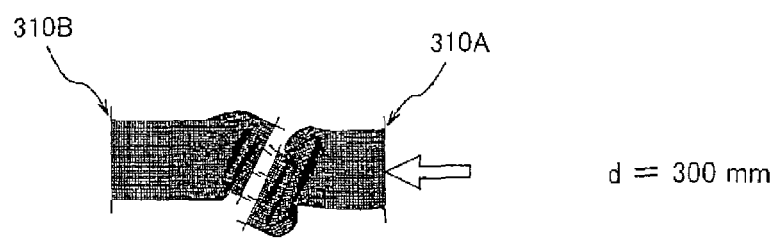
Fig. 12C  d = 300 mm
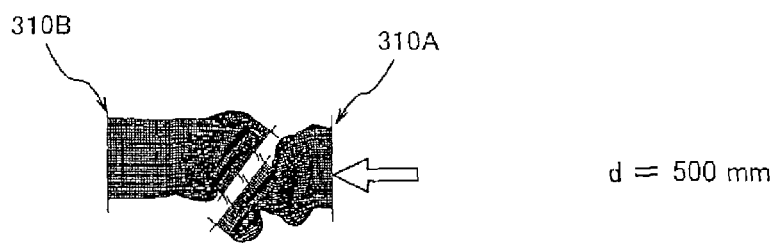
Fig. 12D  d = 500 mm
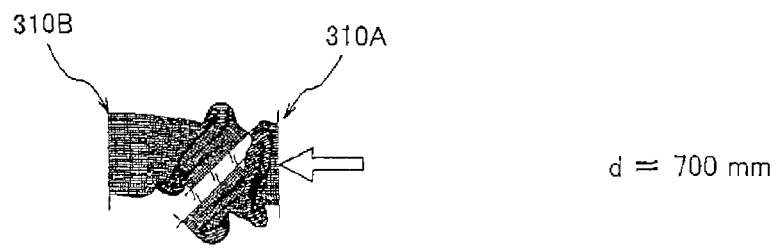
Fig. 12E  d = 700 mm d = 0 mm d = 100 mm d = 300 mm d = 500 mm d = 700 mm

CRASH ENERGY ABSORBER OF RAILCAR

TECHNICAL FIELD

The present invention relates to a crash energy absorber provided at a front portion of a carbody of a railcar and configured to crush by a load from a front side to absorb crash energy.

BACKGROUND ART

Conventionally known is an energy absorbing member attached to a front portion of an underframe of a carbody of a railcar and configured to absorb crash energy when an obstacle crashes with the energy absorbing member (see Japanese Laid-Open Patent Application Publication No. 2002-286066, for example). Such an energy absorbing member is typically formed by a hollow columnar member and provided such that an axial direction thereof coincides with a carbody front-rear direction. With this, when the obstacle crashes with the energy absorbing member, the plastic deformation of the energy absorbing member in the axial direction occurs such that the energy absorbing member becomes an accordion shape. Thus, the energy absorbing member absorbs the crash energy to reduce the impact transmitted to the carbody.

SUMMARY OF INVENTION

Technical Problem

Respective railcars that travel on the same railway track are designed such that the heights of the underframes thereof are substantially equal to one another. However, because of the displacement of a spring system of a bogie configured to support the carbody, the heights of the underframes of respective railcars that are traveling may change depending on traveling conditions. Therefore, if the railcars crash head-on with each other, there is a possibility that because the heights of the underframes of those railcars are different from each other, the heights of the energy absorbing members of those railcars differ from each other by several tens of millimeters in a vertical direction. If such a crash occurs, for example, the energy absorbing members that have crashed with each other incline in a pitch direction while the energy absorbing members are deforming. Thus, the energy absorbing performance may deteriorate. (Hereinafter, a head-on crash of railcars whose positions are different from each other in the vertical direction is referred to as a "vertical offset crash".)

To increase the energy absorbing performance, the energy absorbing members having large vertical sizes may be used. However, even if the vertical sizes of the energy absorbing members are just increased, the energy absorbing members may incline and deform by a biased load applied to the energy absorbing members in the vertical direction at the time of the vertical offset crash. Therefore, stable energy absorption cannot be performed. In addition, according to the energy absorbing member having the large vertical size, the initial load at the time of the crash becomes high, so that the impact transmitted to the carbody becomes high. Therefore, the carbody needs to be strengthened, and this increases the weight of the carbody.

Here, an object of the present invention is to realize stable crash energy absorption at the time of the vertical offset crash without increasing the weight of the carbody.

Solution to Problem

A crash energy absorber of a railcar according to the present invention is a crash energy absorber provided at a front portion of a carbody of a railcar and configured to crush by a load from a front side to absorb crash energy, the crash energy absorber including: a main absorbing portion extending in a front-rear direction; and a pair of sub absorbing portions respectively provided at upper and lower sides of the main absorbing portion, wherein each of the pair of sub absorbing portions is formed integrally with the main absorbing portion via breakable portions each extending in the front-rear direction.

According to the above configuration, if an obstacle crashes with the crash energy absorber in a state where the obstacle is located higher than the crash energy absorber, the obstacle does not crash with the sub absorbing portion on the lower side but crashes with the main absorbing portion and the sub absorbing portion on the upper side. In this case, the main absorbing portion and the sub absorbing portion on the upper side may crush while the breakable portions between the main absorbing portion and the sub absorbing portion on the lower side are being broken. In this crash phenomenon, from a dynamic point of view, a height-direction center of the crash energy absorber that crushes may be regarded as a height-direction center of a portion including the main absorbing portion and the sub absorbing portion on the upper side (that is, a portion other than the sub absorbing portion on the lower side).

Therefore, a dynamic vertical offset amount can be made smaller than an offset amount (shift amount) between the entire crash energy absorber and the obstacle in the vertical direction. On this account, at the time of the vertical offset crash, the crash energy absorber is prevented from deforming so as to be inclined. As a result, even in the vertical offset crash, the stable energy absorption can be performed without increasing the weight of the carbody. If the obstacle crashes with the crash energy absorber in a state where the obstacle is located lower than the crash energy absorber, the main absorbing portion and the sub absorbing portion on the lower side may crush while the breakable portions between the main absorbing portion and the sub absorbing portion on the upper side are being broken. Therefore, even in this case, the same effects as above can be obtained.

BRIEF DESCRIPTION OF DRAWINGS

FIGS. 12A to 12E are side views each showing the deformation behaviors of crash energy absorbing members when the vertical offset crash of the crash energy absorbing members is caused by Finite Element Analysis in Comparative Example 1.

DESCRIPTION OF EMBODIMENTS

Hereinafter, an embodiment according to the present invention will be explained in reference to the drawings.

Figure 1:
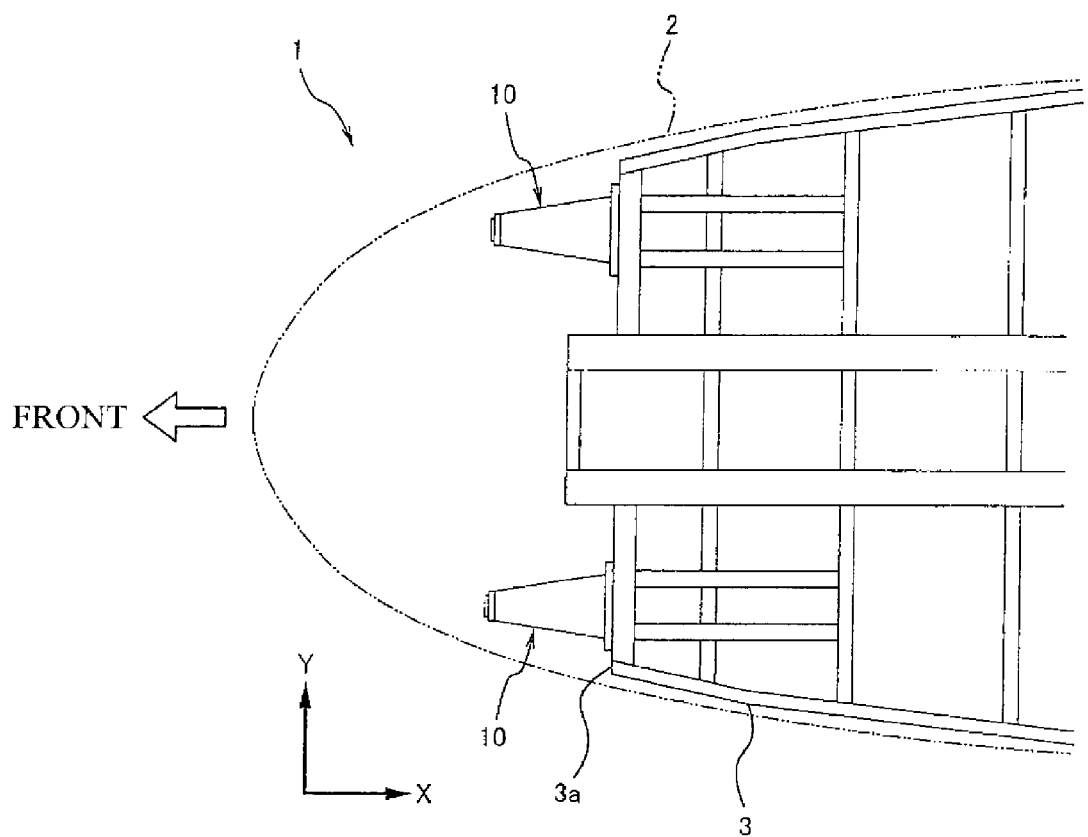
FIG. 1 is a schematic plan view showing a state where crash energy absorbers according to an embodiment of the present invention are attached to a railcar.

FIG. 1 is a schematic plan view showing a state where crash energy absorbers 10 according to the embodiment of the present invention are attached to a railcar 1. As shown in FIG. 1, in the railcar 1 that travels at high speed, a pair of left and right crash energy absorbers 10 are fixed to a front portion 3a of an underframe 3 of a carbody 2 of a first car of the railcar 1 so as to project toward a front side. With this, for example, if the railcars that travel on the same railway track crash head-on with each other, the crash energy absorbers 10 crush by a load from the front side to absorb crash energy.

Figure 2:
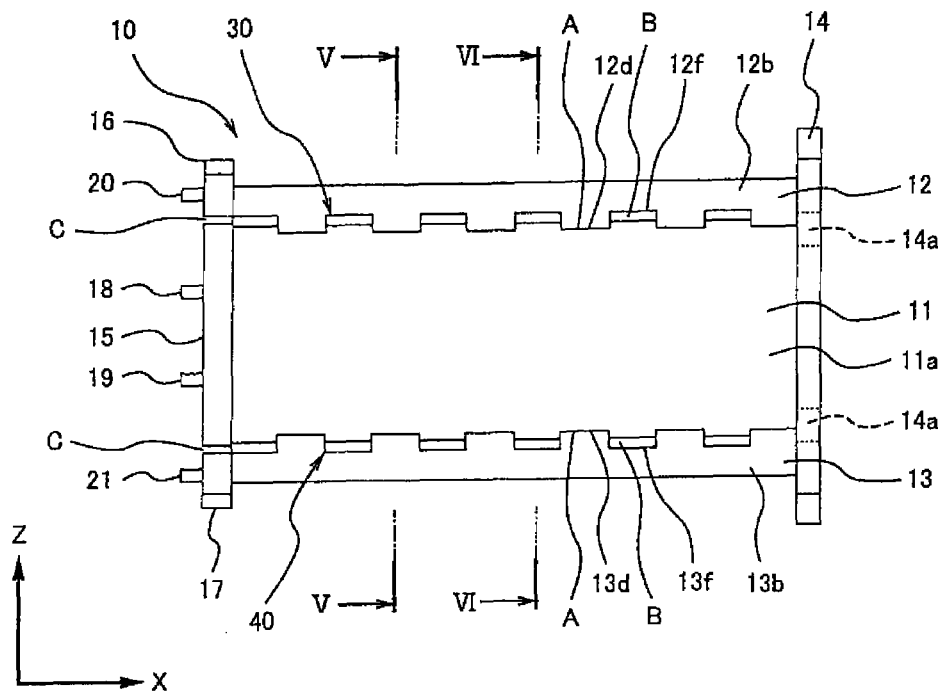
FIG. 2 is a side view of the crash energy absorber according to the embodiment of the present invention.
Figure 3:
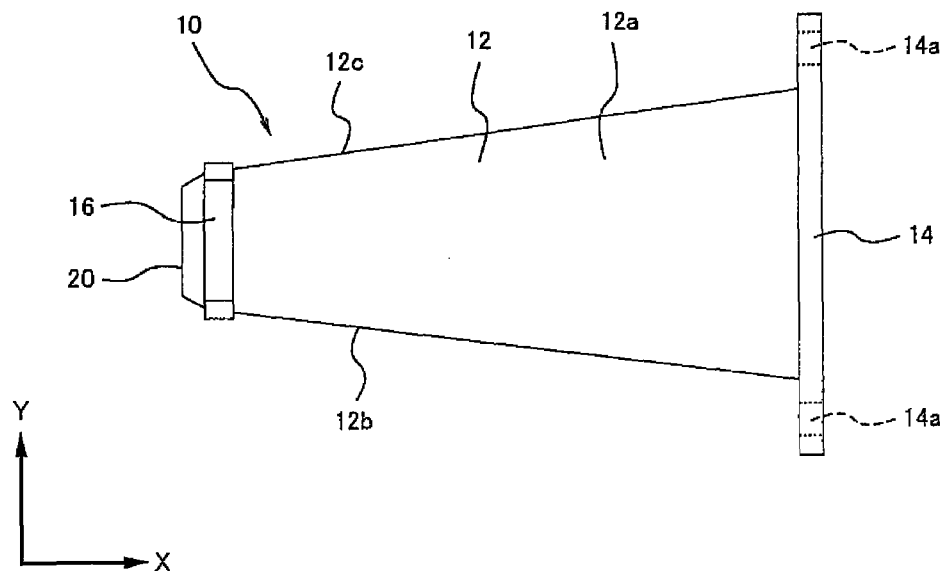
FIG. 3 is a plan view of the crash energy absorber of FIG. 2.
Figure 4:
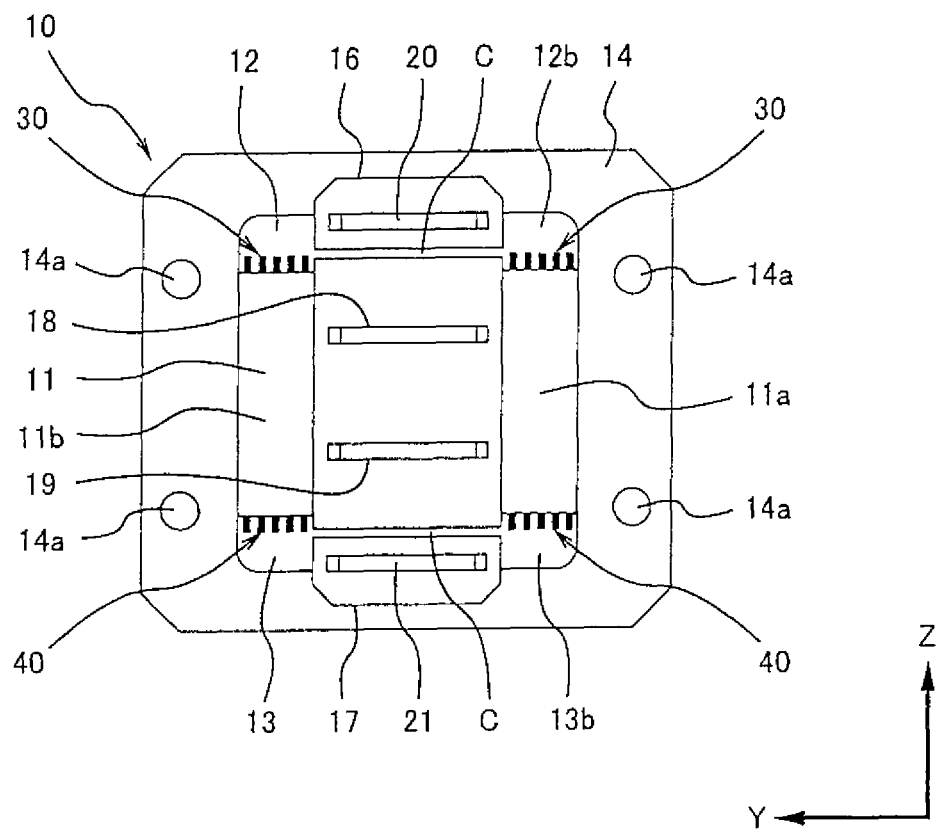
FIG. 4 is a front view of the crash energy absorber of FIG. 2.
Figure 5:
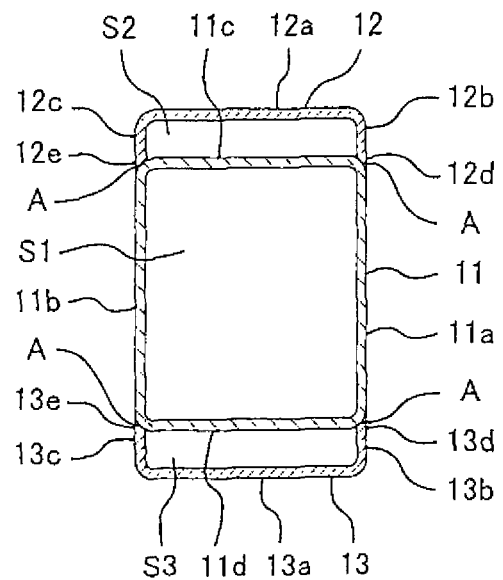
FIG. 5 is a cross-sectional view taken along line V-V of FIG. 2.
Figure 6:
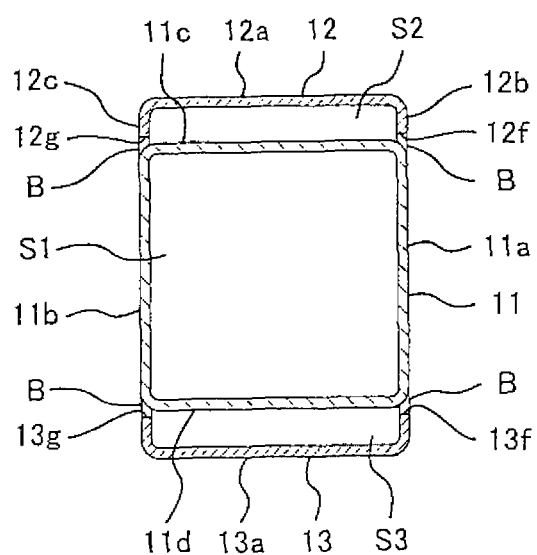
FIG. 6 is a cross-sectional view taken along line VI-VI of FIG. 2.

FIG. 2 is a side view of the crash energy absorber 10 according to the embodiment of the present invention. FIG. 3 is a plan view of the crash energy absorber 10 of FIG. 2. FIG. 4 is a front view of the crash energy absorber 10 of FIG. 2. FIG. 5 is a cross-sectional view taken along line V-V of FIG. 2. FIG. 6 is a cross-sectional view taken along line VI-VI of FIG. 2. In the drawings, a front-rear direction (railcar traveling direction) is denoted by X, a railcar width direction is denoted by Y, and a vertical direction is denoted by Z.

As shown in FIGS. 2 to 6, each of the crash energy absorbers 10 has a symmetrical shape in the vertical direction (direction Z) and the railcar width direction (direction Y) and is made of a metal material, such as steel or aluminum alloy. The crash energy absorber 10 includes: a substrate portion 14 on which bolt holes 14a for fixing the substrate portion 14 to the underframe 3 are formed at required positions; a main absorbing portion 11 extending from the substrate portion 14 toward the front side; an upper sub absorbing portion 12 provided at an upper side of the main absorbing portion 11 and extending from the substrate portion 14 toward the front side; and a lower sub absorbing portion 13 provided at a lower side of the main absorbing portion 11 and extending from the substrate portion 14 toward the front side. The upper sub absorbing portion 12 and the lower sub absorbing portion 13 are formed integrally with the main absorbing portion 11 via below-described breakable portions 30 and 40.

An internal space S1 of the main absorbing portion 11 is formed by a left side wall portion 11a, a right side wall portion 11b, an upper wall portion 11c, and a lower wall portion 11d. The main absorbing portion 11 has a tubular shape having a quadrangular frame-shaped cross section when viewed from the front side. The main absorbing portion 11 is provided such that an axis thereof extends in the front-rear direction. In the main absorbing portion 11, the left and right side wall portions 11a and 11b are inclined so as to get close to each other as the left and right side wall portions 11a and 11b extend from the substrate portion 14 toward the front side, and the upper wall portion 11c and the lower wall portion 11d are provided substantially horizontally.

The upper sub absorbing portion 12 includes an upper wall portion 12a, a left side wall portion 12b, and a right side wall portion 12c, and has an inverted U-shaped cross section when viewed from the front side. Lower end portions of the left and right side wall portions 12b and 12c of the upper sub absorbing portion 12 are coupled to the main absorbing portion 11. With this, an internal space S2 is formed by the upper sub absorbing portion 12 and the upper wall portion 11c of the main absorbing portion 11. In the upper sub absorbing portion 12, the left and right side wall portions 12b and 12c are inclined so as to get close to each other as they extend from the substrate portion 14 toward the front side, and the upper wall portion 12a is provided substantially horizontally. To be specific, the side wall portions 12b and 12c of the upper sub absorbing portion 12 are substantially flush with the side wall portions 11a and 11b of the main absorbing portion 11, respectively, and the upper wall portion 12a of the upper sub absorbing portion 12 is substantially parallel to the upper wall portion 11c of the main absorbing portion 11.

A plurality of convex portions 12d and concave portions 12f are provided alternately in the front-rear direction at the lower end portion of the left side wall portion 12b of the upper sub absorbing portion 12, and a plurality of convex portions 12e and concave portions 12g are provided alternately in the front-rear direction at the lower end portion of the right side wall portion 12c of the upper sub absorbing portion 12. In the upper sub absorbing portion 12, the convex portions 12d and 12e are fixed to the main absorbing portion 11 by, for example, welding, and the concave portions 12f and 12g are not fixed to the main absorbing portion 11. To be specific, a plurality of coupling portions A for partially coupling the main absorbing portion 11 and the upper sub absorbing portion 12 are provided so as to be spaced apart from one another in the front-rear direction, and portions each sandwiched between the adjacent coupling portions A are slit-shaped non-coupling portions B. With this, perforation lines each formed by a plurality of coupling portions A and non-coupling portions B are formed between the main absorbing portion 11 and the upper sub absorbing portion 12 so as to extend in the front-rear direction, and these lines serve as the breakable portions 30 that break more easily than the other portions. The breakable portions 30 are formed substantially horizontally over the entire lengths of the main absorbing portion 11 and the upper sub absorbing portion 12 in the front-rear direction.

The lower sub absorbing portion 13 has a vertically inverted shape of the shape of the upper sub absorbing portion 12. Specifically, the lower sub absorbing portion 13 includes a lower wall portion 13a, a left side wall portion 13b, and a right side wall portion 13c, and has a U-shaped cross section when viewed from the front side. Upper end portions of the left and right side wall portions 13b and 13c are coupled to the main absorbing portion 11. With this, an internal space S3 is formed by the lower sub absorbing portion 13 and the lower wall portion 11d of the main absorbing portion 11. In the lower sub absorbing portion 13, the left and right side wall portions 13b and 13c are inclined so as to get close to each other as they extend from the substrate portion 14 toward the front side, and the lower wall portion 13a is provided substantially horizontally. To be specific, the side wall portions 13b and 13c of the lower sub absorbing portion 13 are substantially flush with the side wall portions 11a and 11b of the main absorbing portion 11, respectively, and the lower wall portion 13a of the lower sub absorbing portion 13 is substantially parallel to the lower wall portion 11d of the main absorbing portion 11.

A plurality of convex portions 13d and concave portions 13f are provided alternately in the front-rear direction at the upper end portion of the left side wall portion 13b of the lower sub absorbing portion 13, and a plurality of convex portions 13e and concave portions 13g are provided alternately in the front-rear direction at the upper end portion of the right side wall portion 13c of the lower sub absorbing portion 13. In the lower sub absorbing portion 13, the convex portions 13d and 13e are fixed to the main absorbing portion 11 by, for example, welding, and the concave portions 13f and 13g are not fixed to the main absorbing portion 11. To be specific, a plurality of coupling portions A for partially coupling the main absorbing portion 11 and the lower sub absorbing portion 13 are provided so as to be spaced apart from one another in the front-rear direction, and portions each sandwiched between the adjacent coupling portions A are slit-shaped non-coupling portions B. With this, perforation lines each formed by a plurality of coupling portions A and non-coupling portions B are formed between the main absorbing portion 11 and the lower sub absorbing portion 13 so as to extend in the front-rear direction, and these lines serve as the breakable portions 40 that break more easily than the other portions. The breakable portions 40 are formed substantially horizontally over the entire lengths of the main absorbing portion 11 and the lower sub absorbing portion 13 in the front-rear direction.

The left and right breakable portions 30 of the upper sub absorbing portion 12 are provided at substantially the same height, and the left and right breakable portions 40 of the lower sub absorbing portion 13 are provided at substantially the same height. Each of the vertical heights of the sub absorbing portions 12 and 13 is smaller than the vertical height of the main absorbing portion 11. Specifically, each of the vertical heights of the sub absorbing portions 12 and 13 is 0.1 to 0.3 time (in the present embodiment, about 0.2 time) the vertical height of the main absorbing portion 11.

A main front wall 15 is provided at a front portion of the main absorbing portion 11 so as to close a front opening of the internal space S1. An upper sub front wall 16 is provided at a front portion of the upper sub absorbing portion 12 so as to close the internal space S2. A lower sub front wall 17 is provided at a front portion of the lower sub absorbing portion 13 so as to close the internal space S3. The main front wall 15 and the upper sub front wall 16 are provided with a gap C therebetween, and the main front wall 15 and the lower sub front wall 17 are provided with the gap C therebetween. Then, at a front end portion, continuous with the sub front wall 16, of the sub absorbing portion 12 and a front end portion, continuous with the sub front wall 17, of the sub absorbing portion 13, each of the lower ends of the side walls 12b, 12c, 13b, and 13c is spaced apart from the main absorbing portion 11 by the gap C, that is, is not coupled to the main absorbing portion 11. To be specific, the front end portions of the sub absorbing portions 12 and 13 are not coupled to the main absorbing portion 11. Each of the positions of the front end portions of the sub absorbing portions 12 and 13 in the front-rear direction is substantially the same as the position of the front end portion of the main absorbing portion 11 in the front-rear direction, and each of the front-rear lengths of the sub absorbing portions 12 and 13 is substantially the same as that of the main absorbing portion 11. The main front wall 15, the upper sub front wall 16, and the lower sub front wall 17 are provided so as to be substantially flush with one another. Anti-climbers 18 to 21 each extending in a left-right direction are provided on and project from front surfaces of the main front wall 15, the upper sub front wall 16, and the lower sub front wall 17 so as to be spaced apart from one another.

Figure 7:
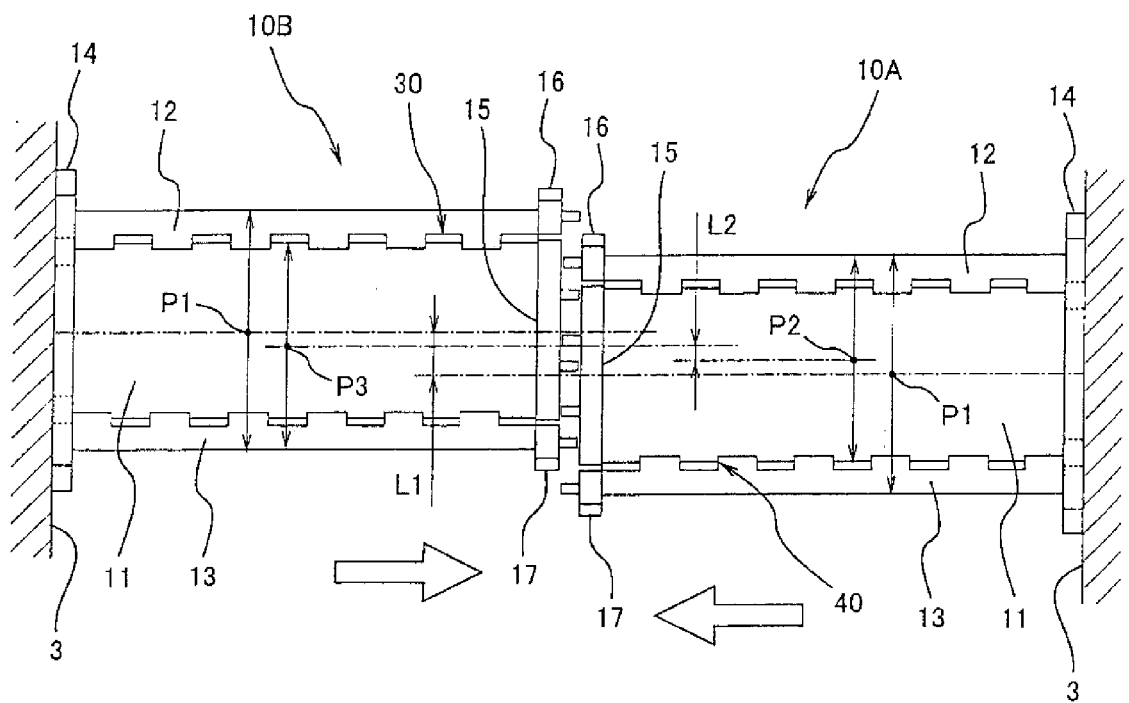
FIG. 7 is a side view for explaining the vertical offset crash of the crash energy absorbers of FIG. 2.
Figure 8A:
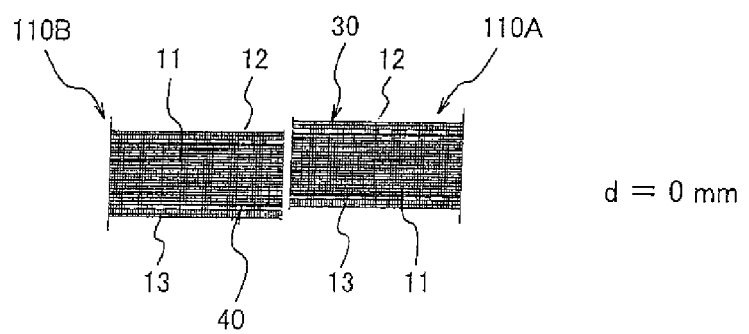
FIGS. 8A to 8E are side views each showing deformation behaviors of the crash energy absorbers when the vertical offset crash of the crash energy absorbers is caused by Finite Element Analysis in Example 1.
Figure 8B:
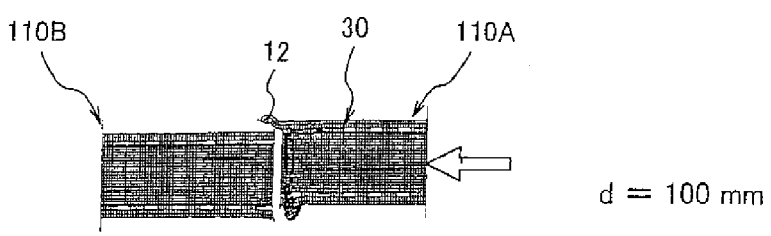
Figure 8C:
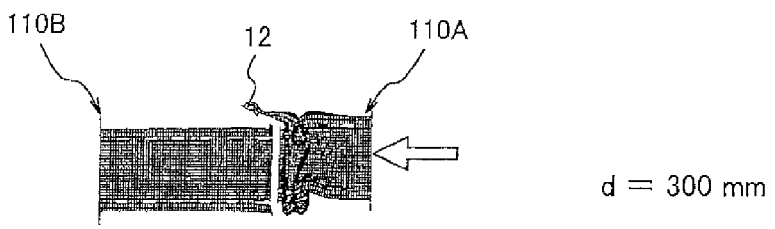
Figure 8D:
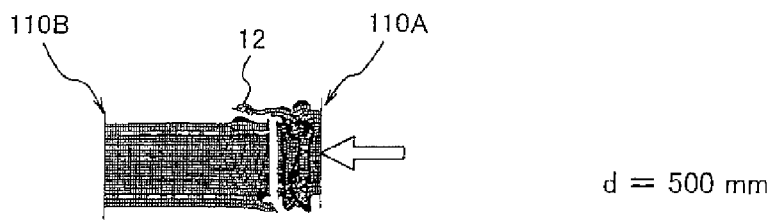
Figure 8E:
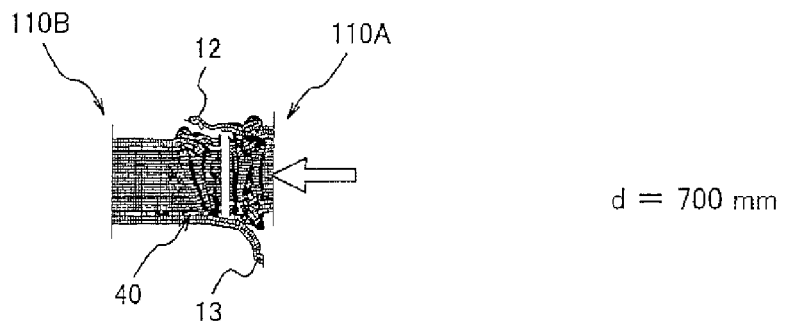

FIG. 7 is a side view for explaining the vertical offset crash of the crash energy absorbers 10 of FIG. 2. As shown in FIG. 7, for example, there may be a case where the railcars that travel on the same railway track crash head-on with each other, and a crash energy absorber 10A fixed to the underframe 3 of one of the railcars and a crash energy absorber 10B of the other railcar crash with each other in a state where the crash energy absorber 10B is located higher than the crash energy absorber 10A. In this case, the crash energy absorber 10B may not crash with the lower sub absorbing portion 13 of the crash energy absorber 10A but crash with only the main absorbing portion 11 and upper sub absorbing portion 12 of the crash energy absorber 10A. (In other words, the crash energy absorber 10A may not crash with the upper sub absorbing portion 12 of the crash energy absorber 10B but crash with only the main absorbing portion 11 and lower sub absorbing portion 13 of the crash energy absorber 10B.)

At the time of such a vertical offset crash, the main absorbing portion 11 and upper sub absorbing portion 12 of the crash energy absorber 10A may crush while the breakable portions 40 each between the main absorbing portion 11 and the lower sub absorbing portion 13 are being broken. In this crash phenomenon, from a dynamic point of view, a height-direction center of the crash energy absorber 10A that crushes may be regarded as a height-direction center P2 of a portion other than the lower sub absorbing portion 13, that is, a height-direction center P2 of a portion including the main absorbing portion 11 and the upper sub absorbing portion 12. To be specific, the dynamic height-direction center P2 of the crushed portion of the crash energy absorber 10A at the time of the vertical offset crash is located higher than a height-direction center P1 of the entire crash energy absorber 10A.

At the time of the vertical offset crash, the main absorbing portion 11 and lower sub absorbing portion 13 of the crash energy absorber 10B may crush while the breakable portions 30 each between the main absorbing portion 11 and the upper sub absorbing portion 12 are being broken. In this crash phenomenon, from a dynamic point of view, a height-direction center of the crash energy absorber 10B that crushes may be regarded as a height-direction center P3 of a portion other than the upper sub absorbing portion 12, that is, a height-direction center P3 of a portion including the main absorbing portion 11 and the lower sub absorbing portion 13. To be specific, the dynamic height-direction center P3 of the crushed portion of the crash energy absorber 10B at the time of the vertical offset crash is located lower than a height-direction center P1 of the entire crash energy absorber 10B.

Therefore, a dynamic vertical offset amount L2 between the crash energy absorber 10A and the crash energy absorber 10B can be made smaller than a structural vertical offset amount L1 therebetween. On this account, at the time of the vertical offset crash, the crash energy absorbers 10A and 10B can be prevented from being inclined in the pitch direction. As a result, even in the vertical offset crash, the stable energy absorption can be performed without increasing the weight of the carbody.

The vertical offset amount L1 between the structural centers P1 of the crash energy absorbers 10A and 10B that crash with each other is made smaller than the vertical offset amount L2 between the dynamic centers P2 and P3 of the crash energy absorbers 10A and 10B. With this, the generation of a vertical-direction component of the reaction force is suppressed, and the crash energy absorber 10A can be prevented from getting on the crash energy absorber 10B.

In the crash energy absorber 10A, the main absorbing portion 11 and the upper sub absorbing portion 12 that crush respectively have portions that show different dynamic behaviors from each other by the existence of the non-coupling portions B, and those dynamic behaviors are combined and averaged, so that the fluctuations of the reaction force of the entire crash energy absorber 10A can be reduced. To be specific, in the cross section of the coupling portions A, the main absorbing portion 11 and the upper sub absorbing portion 12 are formed integrally. However, in the cross section of the non-coupling portions B, the main absorbing portion 11 and the upper sub absorbing portion 12 are formed separately. In the cross section of the non-coupling portions B, the main absorbing portion 11 and the upper sub absorbing portion 12 may deform independently. Therefore, the reaction forces generated individually by the above deformations are combined, so that the fluctuations of the reaction force of the entire crash energy absorber 10A can be suppressed.

The sub absorbing portions 12 and 13 are respectively provided on the upper and lower sides of the main absorbing portion 11, and a bulging deformation of the main absorbing portion 11 in the vertical direction by the crush is suppressed by the sub absorbing portions 12 and 13. Therefore, the fluctuations of the reaction force of the crash energy absorber 10 at the time of the crash are further suppressed. In addition, the average reaction force during the crash increases, so that the absorbing effect of the crash energy can be stably improved.

The main front wall 15 and the upper sub front wall 16 are provided with the gap C therebetween, the main front wall 15 and the lower sub front wall 17 are provided with the gap C therebetween, and the front end portions of the sub absorbing portions 12 and 13 are not coupled to the main absorbing portion 11. Therefore, the gaps C serve as break start points of the breakable portions 30 and 40, and the break along the breakable portions 30 and 40 is induced. At an initial stage of the vertical offset crash, one of the upper sub front wall 16 and the lower sub front wall 17 does not involve in the crash. However, since the main front wall 15 and the sub front walls 16 and 17 are substantially flush with one another, and the positions of the main absorbing portion 11 and the sub absorbing portions 12 and 13 in the front-rear direction are substantially the same as one another, the reaction force generated in the crash energy absorber 10 at the initial stage of the crash is prevented from being reduced, and the break at the breakable portions 30 and 40 is induced by the initial reaction force. Therefore, the break of the breakable portions 30 and 40 can be caused stably.

Each of the vertical heights of the sub absorbing portions 12 and 13 is smaller than the vertical height of the main absorbing portion 11. Therefore, at the time of the vertical offset crash, the crash energy can be stably absorbed by the main absorbing portion 11 that is large in height. In addition, since the vertical heights of the sub absorbing portions 12 and 13 are small, the break of the breakable portions 30 and 40 can be stably caused even if the vertical offset amount L1 at the time of the vertical offset crash is small.

The upper wall portion 11c and lower wall portion 11d of the main absorbing portion 11, the upper wall portion 12a of the upper sub absorbing portion 12, the lower wall portion 13a of the lower sub absorbing portion 13, and the breakable portions 30 and 40 are provided substantially horizontally. Therefore, in the case of the vertical offset crash, that is, in a case where the railcars respectively including the same crash energy absorbers 10A and 10B crash head-on with each other, the crush of the main absorbing portion 11 and one of the sub absorbing portions 12 and 13 and the break of the breakable portions 30 and 40 can be caused appropriately.

In the present embodiment, each of the breakable portions 30 and 40 is formed in such a manner that a plurality of holes (non-coupling portions B of FIG. 2) are formed like perforation on the crash energy absorber 10 so as to be spaced apart from one another in the front-rear direction. However, the breakable portion may be formed in such a manner that without forming the holes, a plurality of coupling portions between the main absorbing portion and the sub absorbing portion are formed so as to be spaced apart from one another in the front-rear direction. The breakable portion may be realized so as to be formed smaller in thickness than the adjacent portion. In the present embodiment, the front end portions of the sub absorbers 12 and 13 are spaced apart from the main absorbing portion 11. However, the front end portions of the sub absorbers may be provided so as to contact but not to be joined to the main absorbing portion. In the crash energy absorber 10 of the present embodiment, the main absorbing portion 11 and the sub absorbing portions 12 and 13 are formed separately and fixed to one another by, for example, welding. However, the crash energy absorber may be formed by processing a single member in advance.

Crash Analysis

Next, an analytical result of the vertical offset crash by computer simulation using a finite element method will be explained in reference to FIGS. 8A to 15 (Examples 1 and 2 and Comparative Examples 1 and 2).

TABLE 1

|  | Example 1 | Example 2 | Comparative Example 1 | Comparative Example 2 |
| --- | --- | --- | --- | --- |
| Breakable Portion | Formed | Formed | Not formed | Not formed |
| Quality of Material | SMA570 | SS400 | SMA570 | SS400 |

In Examples 1 and 2, used as an analytical model was a mesh finite element model of the crash energy absorber 10 having the shape shown in FIGS. 2 to 7. In Comparative Examples 1 and 2, used as the analytical model was a mesh finite element model of the crash energy absorber having the same outer shape as Examples 1 and 2 but not including the breakable portions. Respective physical property values in Examples 1 and 2 and Comparative Examples 1 and 2 were those of the materials shown in Table 1 (SMA570 is higher in tensile strength and strength than SS400). In Examples 1 and 2 and Comparative Examples 1 and 2, one crash energy absorber and the other crash energy absorber were offset in the vertical direction. In this case, the vertical offset amount was set such that the upper surface of one crash energy absorber is substantially the same in height as the upper breakable portion 30 of the other crash energy absorber. In Examples 1 and 2 and Comparative Examples 1 and 2, a left end of the crash energy absorber located on the left side in each of FIGS. 8A to 8E, 10A to 10E, 12A to 12E, and 14A to 14E was restricted, and the crash energy absorber located on the right side was forcibly displaced toward the left side to crash with the crash energy absorber located on the left side. Used as an analysis solver of this crash analysis was LS-DYNA Ver. 971 (Livermore Software Technology Corporation).

EXAMPLE 1

Figure 9:
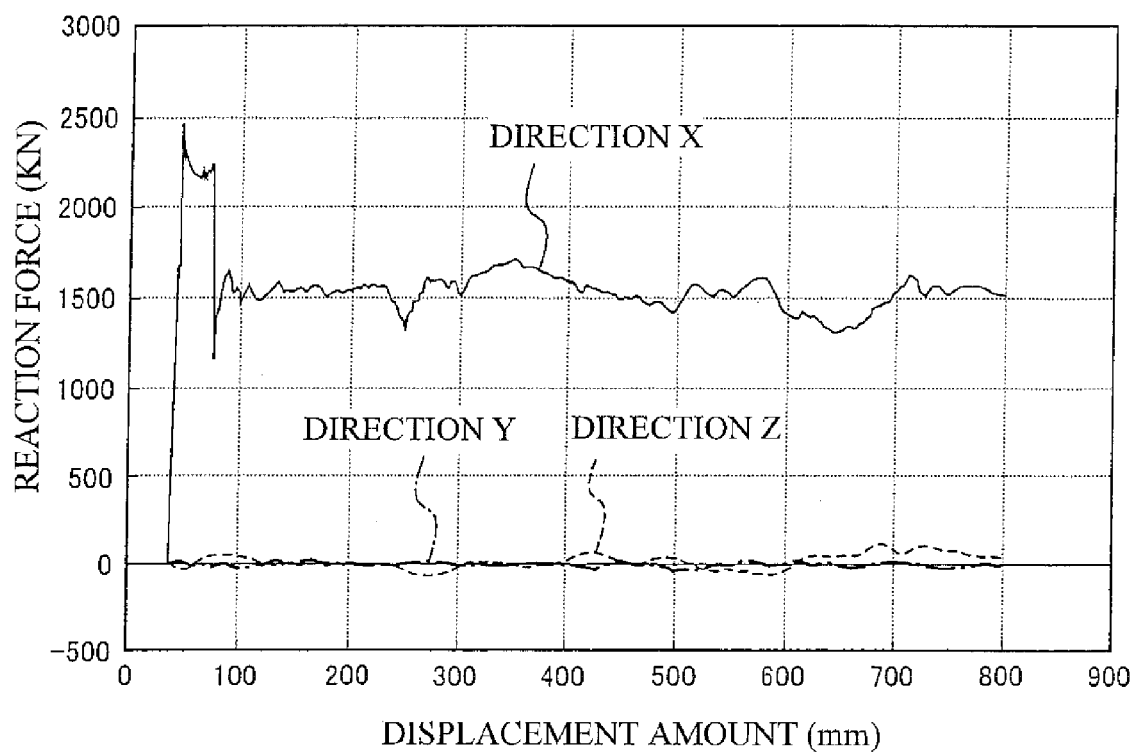
FIG. 9 is a graph showing changes of reaction forces in accordance with a displacement amount at the time of the crash of FIGS. 8A to 8E.
Figure 10A:
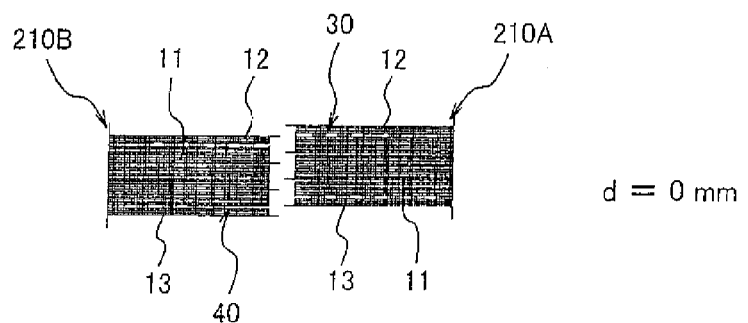
FIGS. 10A to 10E are side views each showing the deformation behaviors of the crash energy absorbers when the vertical offset crash of the crash energy absorbers is caused by Finite Element Analysis in Example 2.
Figure 10B:
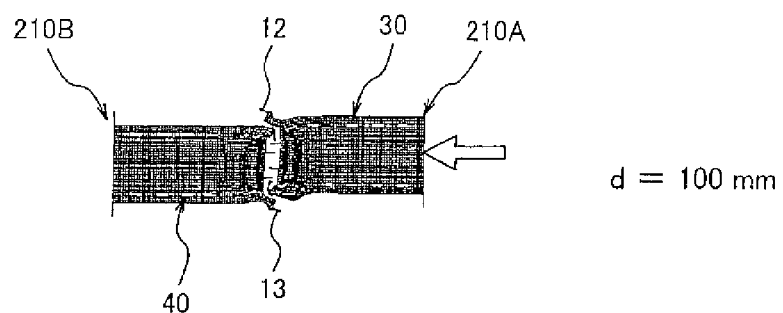
Figure 10C:
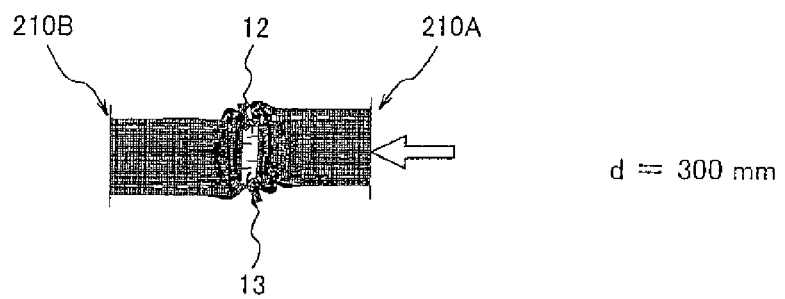
Figure 10D:
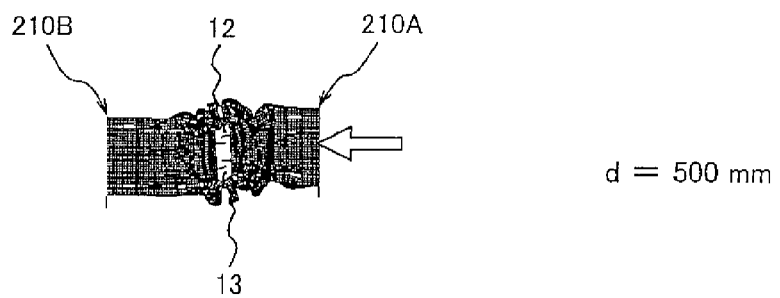
Figure 10E:
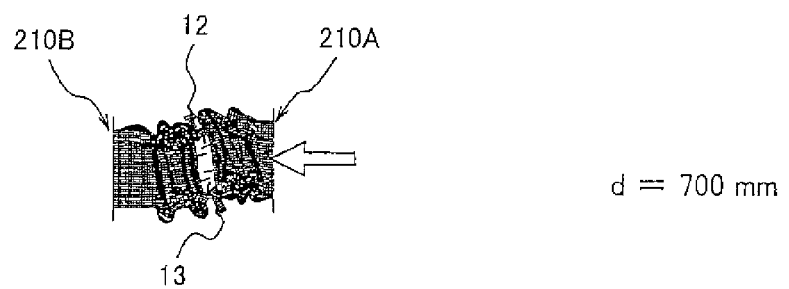

FIGS. 8A to 8E are side views each showing the deformation behaviors of crash energy absorbers 110A and 110B when the vertical offset crash of the crash energy absorbers 110A and 110B is caused by Finite Element Analysis in Example 1. FIG. 9 is a graph showing changes of reaction forces in accordance with a displacement amount at the time of the crash of FIGS. 8A to 8E. As shown in FIGS. 8A to 8E, as a displacement amount d increased during the vertical offset crash of Example 1, the upper sub absorbing portion 12 of the crash energy absorber 110A on the right side broke at the breakable portions 30, and the lower sub absorbing portion 13 of the crash energy absorber 110B on the left side broke at the breakable portions 40. In addition, during the crash, the crash energy absorbers 110A and 110B deformed without being inclined in the pitch direction. As shown in FIG. 9, the reaction force in the front-rear direction (direction X) during the crash was equal to or more than 2,000 kN at the initial stage of the crash. After that, while the displacement amount d was increasing, the reaction force in the front-rear direction (direction X) was about 1,500 kN and did not fluctuate greatly. The reaction force in the railcar width direction (direction Y) and the reaction force in the vertical direction (direction Z) during the crash were not generated so much.

Example 2

Figure 11:
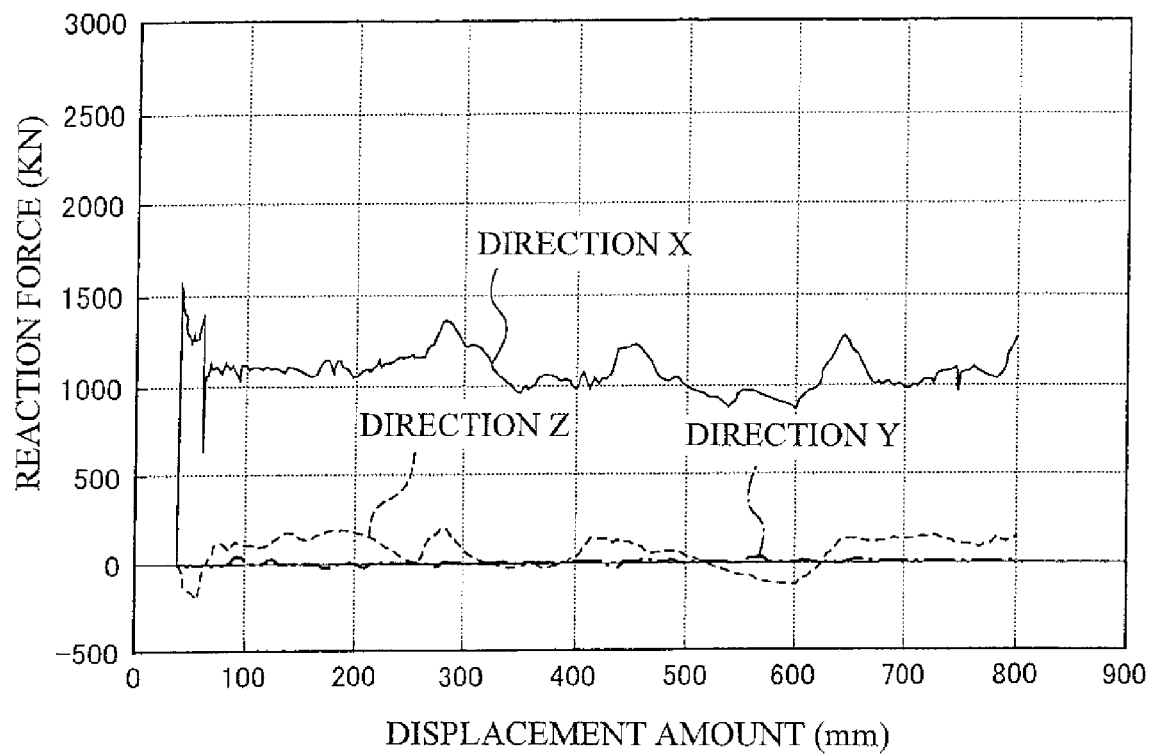
FIG. 11 is a graph showing changes of the reaction forces in accordance with the displacement amount at the time of the crash of FIGS. 10A to 10E.

FIGS. 10A to 10E are side views each showing the deformation behaviors of crash energy absorbers 210A and 210B when the vertical offset crash of the crash energy absorbers 210A and 210B is caused by Finite Element Analysis in Example 2. FIG. 11 is a graph showing changes of the reaction forces in accordance with the displacement amount at the time of the crash of FIGS. 10A to 10E. As shown in FIGS. 10A to 10E, in Example 2, at the initial stage of the crash, the tip end side of the upper sub absorbing portion 12 of the crash energy absorber 210A on the right side broke at the breakable portions 30, and the tip end side of the lower sub absorbing portion 13 of the crash energy absorber 210B on the left side broke at the breakable portions 40. After that, while the displacement amount was increasing, the sub absorbing portions 12 and 13 whose tip end sides were broken were bent to crush in the crash. The crash energy absorbers 210A and 210B deformed during the crash without being inclined in the pitch direction. As shown in FIG. 11, the reaction force in the front-rear direction (direction X) during the crash was about 1,500 kN at the initial stage of the crash. After that, while the displacement amount d was increasing, the reaction force in the front-rear direction (direction X) was about 1,000 kN and did not fluctuate greatly. The reaction force in the railcar width direction (direction Y) during the crash was not generated so much. The reaction force in the vertical direction (direction Z) during the crash was small overall, and the peak thereof was about 200 kN.

COMPARATIVE EXAMPLE 1

Figure 13:
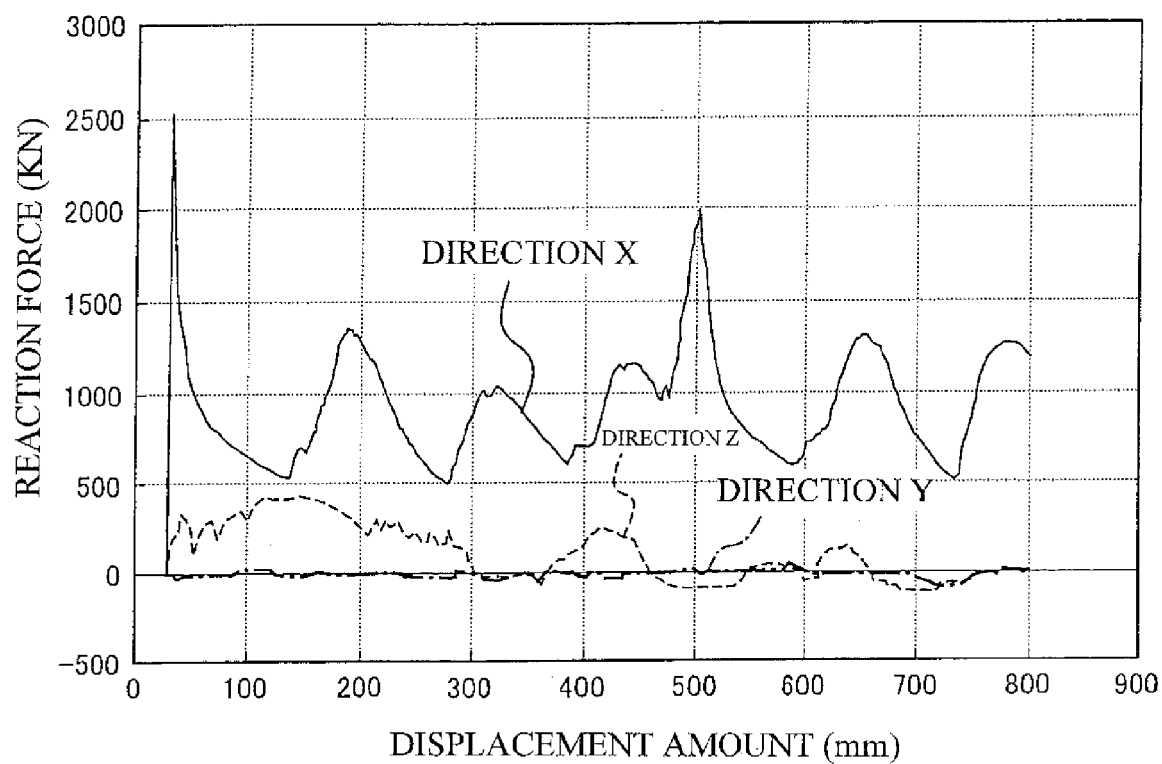
FIG. 13 is a graph showing changes of the reaction forces in accordance with the displacement amount at the time of the crash of FIGS. 12A to 12E.
Figure 14A:
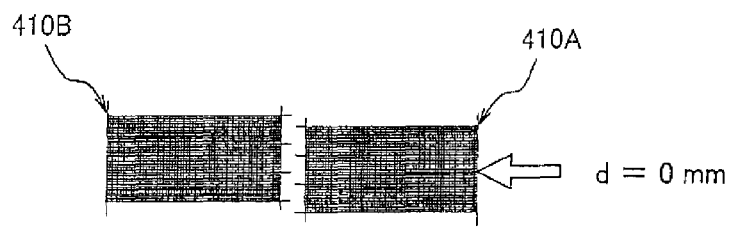
FIGS. 14A to 14E are side views each showing the deformation behaviors of the crash energy absorbing members when the vertical offset crash of the crash energy absorbing members is caused by Finite Element Analysis in Comparative Example 2.
Figure 14B:
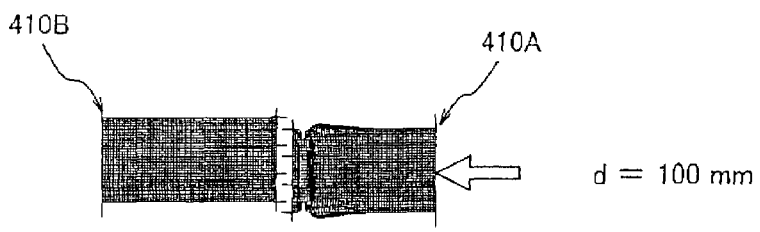
Figure 14C:
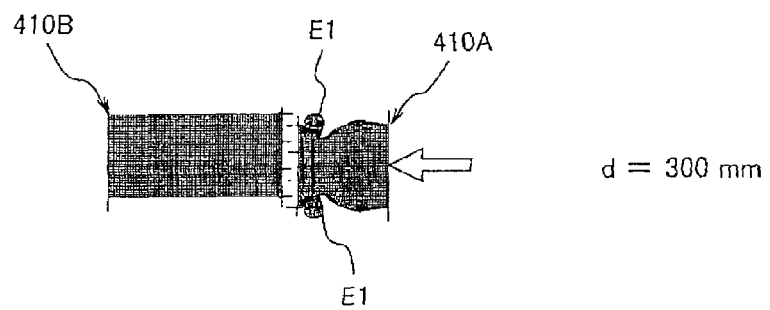
Figure 14D:
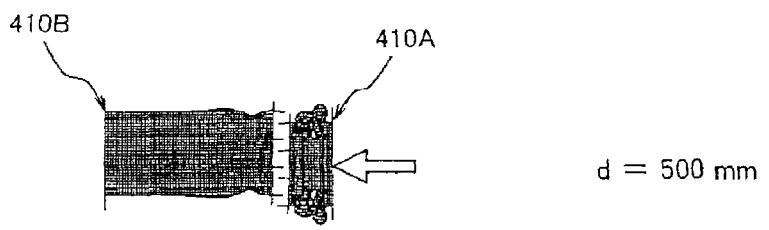
Figure 14E:
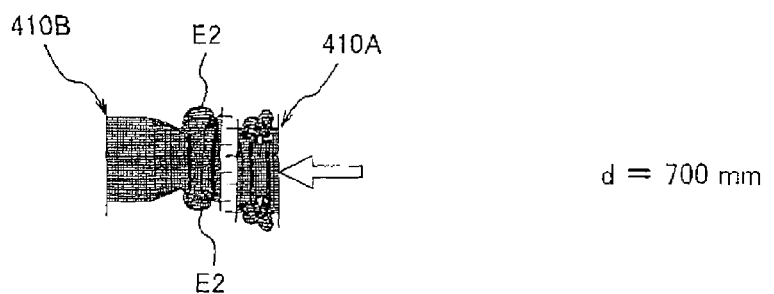

FIGS. 12A to 12E are side views each showing the deformation behaviors of crash energy absorbers 310A and 310B when the vertical offset crash of the crash energy absorbers 310A and 310B is caused by Finite Element Analysis in Comparative Example 1. FIG. 13 is a graph showing changes of the reaction forces in accordance with the displacement amount at the time of the crash of FIGS. 12A to 12E. As shown in FIGS. 12A to 12E, in Comparative Example 1, the crash energy absorbers 310A and 310B deformed during the crash so as to be inclined in the pitch direction. As shown in FIG. 13, the reaction force in the front-rear direction (direction X) during the crash was about 2,500 kN at the initial stage of the crash. After that, while the displacement amount d was increasing, the reaction force in the front-rear direction (direction X) greatly fluctuated between about 500 and 2,000 kN. The reaction force in the railcar width direction (direction Y) during the crash was not generated so much, but the reaction force in the vertical direction (direction Z) during the crash reached about 450 kN at one time.

COMPARATIVE EXAMPLE 2

Figure 15:
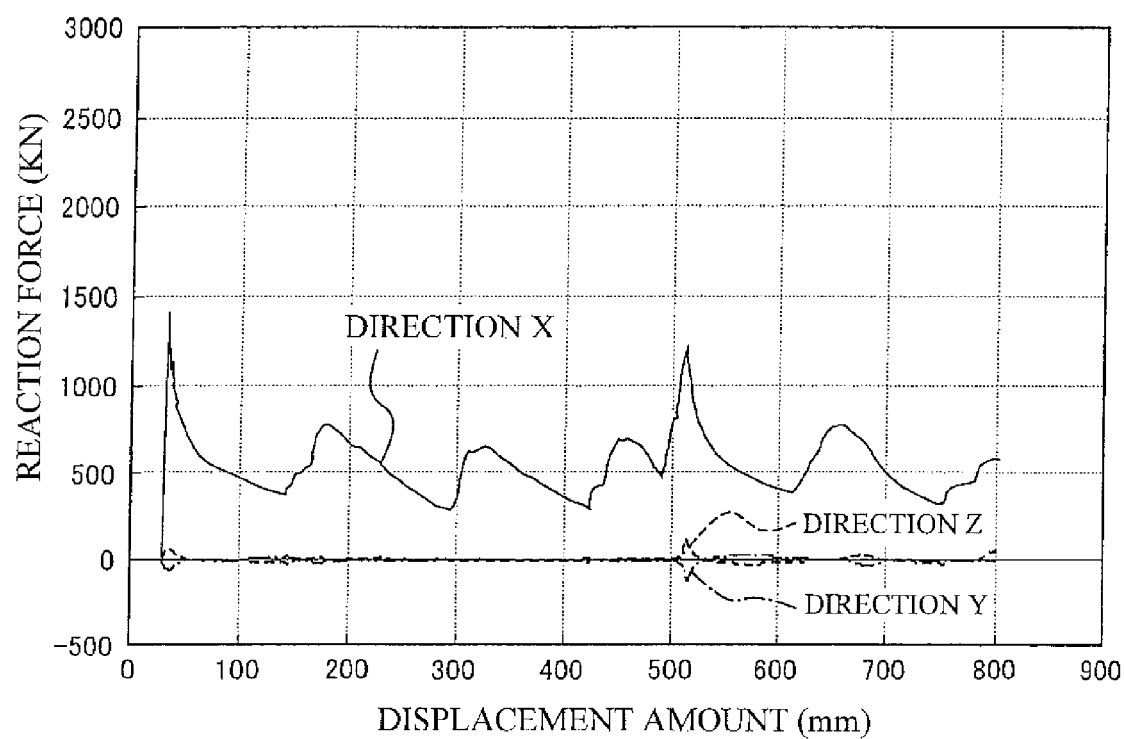
FIG. 15 is a graph showing changes of the reaction forces in accordance with the displacement amount at the time of the crash of FIGS. 14A to 14E.

FIGS. 14A to 14E are side views each showing the deformation behaviors of crash energy absorbers 410A and 410B when the vertical offset crash of the crash energy absorbers 410A and 410B is caused by Finite Element Analysis in Comparative Example 2. FIG. 15 is a graph showing changes of the reaction forces in accordance with the displacement amount at the time of the crash of FIGS. 14A to 14E. As shown in FIGS. 14A to 14E, in Comparative Example 2, the crash energy absorbers 410A and 410B were not inclined in the pitch direction during the crash but deformed such that bulging portions E1 and E2 sharply bulging in the vertical direction were formed. As shown in FIG. 15, the reaction force in the front-rear direction (direction X) during the crash was about 1,400 kN at the initial stage of the crash. After that, while the displacement amount d was increasing, the reaction force in the front-rear direction (direction X) greatly fluctuated between about 300 and 1,200 kN. The reaction force in the railcar width direction (direction Y) and the reaction force in the vertical direction (direction Z) during the crash were not generated so much.

Consideration

As is clear from the analytical results explained above, in Comparative Example 1 using the material having higher strength than the material used in Comparative Example 2, the crash energy absorbers deformed during the crash so as to be inclined in the pitch direction. However, in Examples 1 and 2, the crash energy absorbers did not deform in the pitch direction and stably absorbed the crash energy. In addition, in Comparative Example 1 in which the crash energy absorbers deformed so as to be inclined, the reaction force in the vertical direction (direction Z) was generated during the crash. However, in Examples 1 and 2, the reaction force in the vertical direction (direction Z) during the crash was lower than that in Comparative Example 1, so that one of the energy absorbers that crashed with each other was suitably prevented from getting on the other. Further, in Comparative Examples 1 and 2, the reaction force in the front-rear direction during the crash greatly fluctuated. However, in Examples 1 and 2, the fluctuations of the reaction force in the front-rear direction during the crash were small, and the crash energy was stably absorbed.

The invention claimed is:
1. A crash energy absorber provided at a front portion of a carbody of a railcar and configured to crush by a load from a front side to absorb crash energy, the crash energy absorber comprising:
   a substrate portion;
   a main absorbing portion extending from a front surface of the substrate portion toward a front side;
   an upper sub absorbing portion provided at an upper side of the main absorbing portion and extending from the front surface of the substrate portion toward the front side;
   a lower sub absorbing portion provided at a lower side of the main absorbing portion and extending from the front surface of the substrate portion toward the front side;
   a main front wall provided at a front portion of the main absorbing portion and having at least one projection that extends in a left-right direction and that projects from a front surface of the main front wall;

an upper sub front wall provided at a front portion of the upper sub absorbing portion and having at least one projection that extends in a left-right direction and that projects from a front surface of the upper sub front wall; and a lower sub front wall provided at a front portion of the lower sub absorbing portion and having at least one projection that extends in a left-right direction and that projects from a front surface of the lower sub front wall, wherein:

the upper sub absorbing portion is formed integrally with the main absorbing portion via upper breakable portions extending in a front-rear direction;

the lower sub absorbing portion is formed integrally with the main absorbing portion via lower breakable portions extending in a front-rear direction;

the main absorbing portion includes a tubular portion extending in a front-rear direction;

the upper sub absorbing portion has an inverted U-shaped cross section when viewed from the front side and the lower sub absorbing portion has a U-shaped cross section when viewed from the front side;

the upper sub absorbing portion is coupled to the tubular portion such that a space is formed between the upper sub absorbing portion and an upper wall portion of the tubular portion;

the lower sub absorbing portion is coupled to the tubular portion such that a space is formed between the lower sub absorbing portion and a lower wall portion of the tubular portion; and each of vertical heights of the upper and lower sub absorbing portions is smaller than a vertical height of the main absorbing portion.

2. The crash energy absorber according to claim 1, wherein: each of the upper breakable portions and the lower breakable portions is formed in such a manner that a plurality of coupling portions configured to partially couple the upper sub absorbing portion and the lower sub absorbing portion to the main absorbing portion are provided so as to be spaced apart from one another in the front-rear direction.

3. The crash energy absorber according to claim 1, wherein:

each of the upper breakable portions and the lower breakable portions is formed in such a manner that a plurality of portions of each of left and right end portions, opposed to the main absorbing portion, of the upper or lower sub absorbing portion are fixed to the main absorbing portion so as to be spaced apart from one another in the front-rear direction.

4. The crash energy absorber according to claim 1, wherein:

a lower end of a front end portion of the upper sub absorbing portion is not coupled to the main absorbing portion; and an upper end of a front end portion of the lower sub absorbing portion is not coupled to the main absorbing portion.

5. The crash energy absorber according to claim 1, wherein: positions of front end portions of the upper and lower sub absorbing portions in a front-rear direction are substantially the same as a position of a front end portion of the main absorbing portion in a front-rear direction; and each of the front-rear lengths of the upper and lower sub absorbing portions is substantially the same as that of the main absorbing portion.

6. The crash energy absorber according to claim 1, wherein: each of vertical heights of the upper and lower sub absorbing portions is 0.1 to 0.3 times a vertical height of the main absorbing portion.

7. The crash energy absorber according to claim 1, wherein:

an upper wall portion and lower wall portion of the crash energy absorber are formed substantially horizontally; and the upper and lower breakable portions are formed substantially horizontally.

8. The crash energy absorber according to claim 1, wherein:

positions of rear ends of the upper and lower sub absorbing positions in a front-rear direction are substantially the same as a position of a rear end of the main absorbing portion in the front-rear direction.

* * * * *